US011495225B2

(12) United States Patent
Yoneyama et al.

(10) Patent No.: US 11,495,225 B2
(45) Date of Patent: Nov. 8, 2022

(54) RESPONSE DEVICE, RESPONSE METHOD, AND STORAGE MEDIUM

(71) Applicant: HONDA MOTOR CO., LTD., Tokyo (JP)

(72) Inventors: Kenzo Yoneyama, Wako (JP); Tsutomu Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/903,419

(22) Filed: Jun. 17, 2020

(65) Prior Publication Data
US 2020/0402506 A1 Dec. 24, 2020

(30) Foreign Application Priority Data
Jun. 20, 2019 (JP) .............................. JP2019-114909

(51) Int. Cl.
*G10L 15/00* (2013.01)
*G10L 15/26* (2006.01)
(Continued)

(52) U.S. Cl.
CPC ........ *G10L 15/22* (2013.01); *G06F 16/90335* (2019.01); *G06Q 10/105* (2013.01);
(Continued)

(58) Field of Classification Search
CPC .. G06F 16/22; G06F 16/245; G06F 16/90335; G06Q 10/105; G06T 11/206;
(Continued)

(56) References Cited

U.S. PATENT DOCUMENTS 9,547,647 B2\* 1/2017 Badaskar .............. G06F 16/438
9,971,774 B2\* 5/2018 Badaskar ................ G06F 16/43
(Continued)

FOREIGN PATENT DOCUMENTS

JP 06-243170 9/1994
JP 09-297797 11/1997
(Continued)

OTHER PUBLICATIONS

Japanese Office Action for Japanese Patent Application No. 2019-114909 dated Aug. 17, 2021.
(Continued)

*Primary Examiner* — Khai N. Nguyen
(74) *Attorney, Agent, or Firm* — Amin, Turocy & Watson, LLP

(57) ABSTRACT

A response device includes a data acquirer configured to acquire data to which metadata is added, a database register configured to generate a tag on the basis of the metadata and register the generated tag in a database in association with the data to which the metadata is added, an utterance content interpreter configured to interpret content of an utterance of a user, a searcher configured to search the database using the tag included in the utterance content when an intention to search for the data has been interpreted by the utterance content interpreter, and a responder configured to cause an outputter to output information according to a search result of the searcher.

10 Claims, 10 Drawing Sheets

(51) Int. Cl.
*G10L 15/22* (2006.01)
*G06T 11/20* (2006.01)
*G10L 15/18* (2013.01)
*G06Q 10/10* (2012.01)
*G06F 16/903* (2019.01)
*G10L 15/30* (2013.01)

(52) U.S. Cl.
CPC ........ *G06T 11/206* (2013.01); *G10L 15/1815* (2013.01); *G10L 15/30* (2013.01); *G10L 2015/223* (2013.01)

(58) Field of Classification Search
CPC ..... G10L 15/1815; G10L 15/22; G10L 15/30; G10L 2015/223
USPC .......................................................... 704/235
See application file for complete search history.

(56) References Cited

U.S. PATENT DOCUMENTS

| | | | | |
|---|---|---|---|---|
| 10,217,462 | B2* | 2/2019 | Sarikaya | G10L 15/1822 |
| 10,984,041 | B2* | 4/2021 | Bedadala | G10L 15/22 |
| 11,157,564 | B2* | 10/2021 | Prakash | G06N 5/04 |
| 2014/0081633 | A1* | 3/2014 | Badaskar | G06F 16/43 |
| | | | | 707/723 |
| 2017/0161268 | A1* | 6/2017 | Badaskar | G10L 15/22 |
| 2018/0061401 | A1* | 3/2018 | Sarikaya | G06F 40/174 |
| 2018/0089241 | A1* | 3/2018 | Mendels | G06F 16/93 |
| 2018/0329993 | A1* | 11/2018 | Bedadala | G06F 16/1734 |
| 2019/0272296 | A1* | 9/2019 | Prakash | G06N 7/005 |
| 2020/0402506 | A1* | 12/2020 | Yoneyama | G06F 16/22 |

FOREIGN PATENT DOCUMENTS

| | | |
|---|---|---|
| JP | 2004-289848 | 10/2004 |
| JP | 2007-226843 | 9/2007 |
| JP | 2008-165303 | 7/2008 |
| JP | 2010-250529 | 11/2010 |
| JP | 2015-527683 | 9/2015 |
| JP | 2016-520890 | 7/2016 |
| WO | 2014/151631 | 9/2014 |
| WO | 2018/180201 | 10/2018 |

OTHER PUBLICATIONS

Japanese Office Action for Japanese Patent Application No. 2019-114909 dated Jan. 19, 2021.

* cited by examiner

FIG. 3

| FIELD | STAFF MEMBER | CONTACT METHOD /122 |
|---|---|---|
| *** | | |
| *** | *** | *** |
| *** | | |

FIG. 4

| TITLE | CREATOR | CREATION DATE |
|---|---|---|
| *** | *** | *** |

| SALES COMPANY | VEHICLE MODEL | NUMBER OF SALES |
|---|---|---|
| *** | *** | *** |
| | *** | *** |
| | *** | *** |
| *** | *** | *** |
| | *** | *** |
| | *** | *** |
| *** | *** | *** |
| | *** | *** |
| | *** | *** |
| ... | ... | ... |

RESPONSE DEVICE, RESPONSE METHOD, AND STORAGE MEDIUM

CROSS-REFERENCE TO RELATED APPLICATION

Priority is claimed on Japanese Patent Application No. 2019-114909, filed Jun. 20, 2019, the content of which is incorporated herein by reference.

BACKGROUND

Field of the Invention

The present invention relates to a response device, a response method, and a storage medium.

Description of Related Art

Conventionally, technology for searching for data using metadata added to data registered in a database is known (Published Japanese Translation No. 2016-520890 of the PCT International Publication).

However, in the conventional technology, skill is required to search for data based on metadata and a process in which a user other than a skilled person searches for desired data may be time-consuming.

SUMMARY

The present invention has been made in consideration of such circumstances and an objective of the present invention is to provide a response device, a response method, and a storage medium capable of enabling a user to easily search for data through dialogue.

A response device, a response method, and a storage medium according to the present invention adopt the following configurations.

(1) According to an aspect of the present invention, there is provided a response device including: a data acquirer configured to acquire data to which metadata is added; a database register configured to generate a tag on the basis of the metadata and register the generated tag in a database in association with the data to which the metadata is added; an utterance content interpreter configured to interpret content of an utterance of a user; a searcher configured to search the database using the tag included in the utterance content when an intention to search for the data has been interpreted by the utterance content interpreter; and a responder configured to cause an outputter to output information according to a search result of the searcher.

(2) In the response device according to the above-described aspect (1), the responder is configured to cause the outputter to output the data associated with the tag in the database as it is.

(3) In the response device according to the above-described aspect (2), the database has data with which two or more tags are associated, and the responder is configured to cause the outputter to output the data or the metadata of an attribute matching an attribute of content of a tag obtained from the utterance content within the metadata added to the data associated with the tag obtained from the content of the utterance of the user.

(4) In the response device according to any one of the above-described aspects (1) to (3), the responder is config-ured to generate an image showing a graph using the search result and cause the outputter, which is a display, to output the generated image.

(5) In the response device according to any one of the above-described aspects (1) to (4), the responder is configured to cause the outputter to output information about a staff member associated with the content of the utterance of the user interpreted by the utterance content interpreter with reference to corresponding information in which semantic content is associated with the staff member.

(6) In the response device according to the above-described aspect (1), the responder is configured to cause the outputter to output data kept as it is associated with the tag in the database, the data or the metadata of an attribute matching an attribute of content of the tag obtained from the utterance content within the metadata added to the data associated with the tag obtained from the content of the utterance of the user, an image showing a graph using the search result, and information about a staff member associated with the content of the utterance of the user interpreted by the utterance content interpreter which is a result of referring to corresponding information in which semantic content is associated with the staff member with respect to one utterance of the user.

(7) In the response device according to the above-described aspect (1), the searcher or the responder is a component in which distributed processing is possible, and the searcher or the responder asynchronously is configured to execute causing the outputter to output data kept as it is associated with the tag in the database, the data or the metadata of an attribute matching an attribute of content of the tag obtained from the utterance content within the metadata added to the data associated with the tag obtained from the content of the utterance of the user, an image showing a graph using the search result, and information about a staff member associated with the content of the utterance of the user interpreted by the utterance content interpreter which is a result of referring to corresponding information in which semantic content is associated with the staff member with respect to one utterance of the user.

(8) In the response device according to any one of the above-described aspects (1) to (7), history information including the utterance content and the search result of the searcher is stored in a storage device when the content of the utterance of the user has been interpreted by the utterance content interpreter, and the responder is configured to cause the outputter to output the search result according to the history information read from the storage device with respect to utterance of the user.

(9) In the response device according to the above-described aspects (1) to (8), the utterance content interpreter is configured to interpret the content of the utterance of the user input as natural language.

(10) According to another aspect of the present invention, there is provided a response method including: acquiring, by a computer, data to which metadata is added; generating, by the computer, a tag on the basis of the metadata; registering, by the computer, the generated tag in a database in association with the data to which the metadata is added; interpreting, by the computer, content of an utterance of a user; searching, by the computer, the database using the tag included in the utterance content when an intention to search for the data has been interpreted; and causing, by the computer, an outputter to output information according to a search result.

(11) According to still another aspect of the present invention, there is provided a non-transitory computer-readable storage medium that is configured to store a computer program to be executed by a computer to perform at least: acquiring data to which metadata is added; generating a tag on the basis of the metadata; registering the generated tag in a database in association with the data to which the metadata is added; interpreting content of an utterance of a user; searching the database using the tag included in the utterance content when an intention to search for the data has been interpreted; and causing an outputter to output information according to a search result.

According to the aspects (1) to (11), a user can easily search for data through dialogue.

According to the aspects (2) to (4), data can be provided to the user in an appropriate output format.

According to the aspect (5), information about a staff member familiar with data can be provided to the user.

According to the aspect (6), it is possible to provide the user with data in a plurality of output formats with one utterance.

According to the aspect (7), it is possible to provide a plurality of data items to the user quickly.

According to the aspect (8), it is possible to speed up a process of searching for data through dialogue.

BRIEF DESCRIPTION OF THE DRAWINGS

FIG. 3 is a diagram showing an example of content of corresponding information.

FIG. 4 is a diagram showing an example of content of metadata.

FIG. 5 is a diagram showing an example of content of asset data stored in a database.

DETAILED DESCRIPTION

Embodiments

Figure 1:
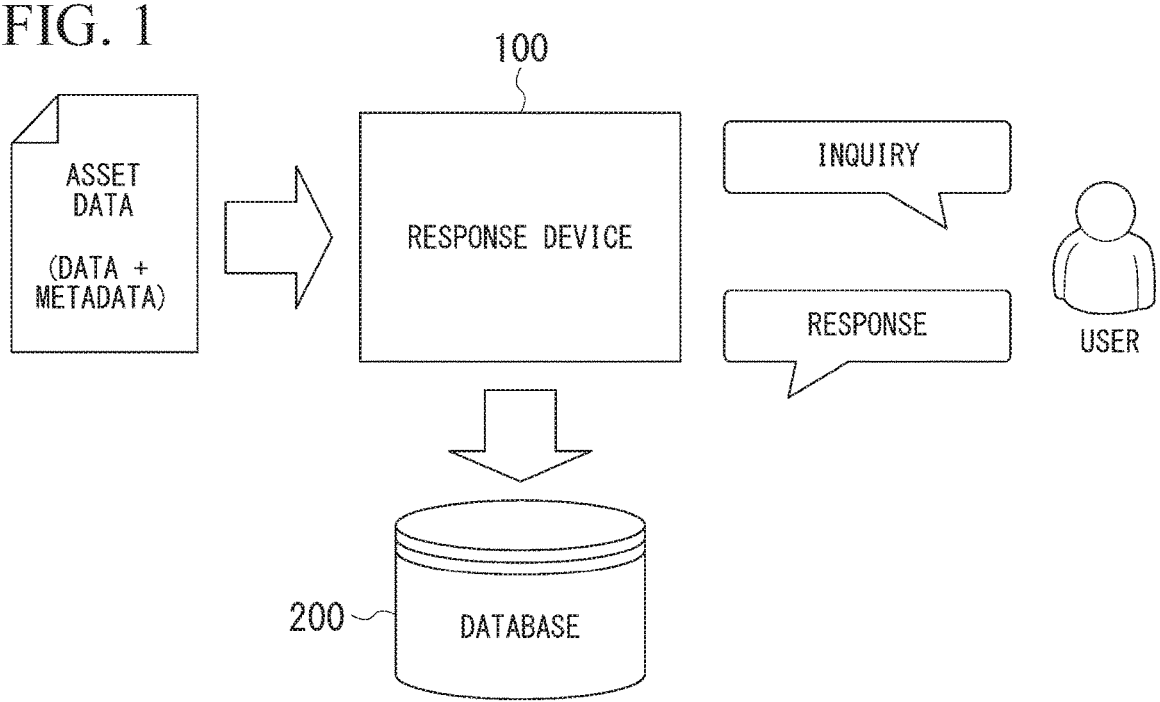
FIG. 1 is a diagram showing an overview of a response device.

Embodiments of a response device, a response method, and a storage medium of the present invention will be described below with reference to the drawings.
[Overview of Response Device 100]
FIG. 1 is a diagram showing an overview of the response device 100. The response device 100 acquires data stored in a database 200 and metadata added to the data from a data holder and stores (registers) the data in the database 200. Hereinafter, the data to which the metadata is added and which is information acquired from the data holder will be referred to as asset data.

Figure 2:
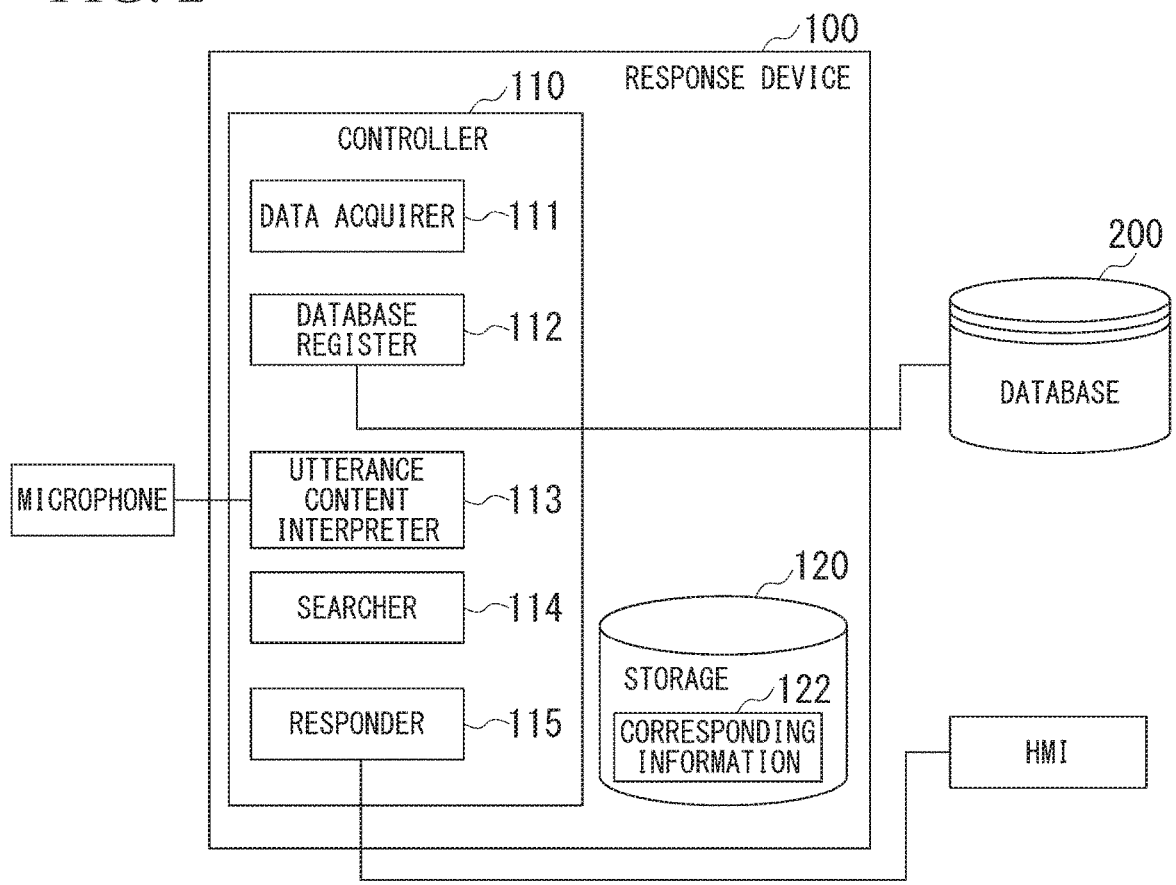
FIG. 2 is a diagram showing an example of a configuration of the response device.

The response device 100 acquires an utterance expressing an intention to search for the asset data from a user who searches for the asset data stored in the database 200 and searches the database 200 for the asset data according to the utterance. The response device 100 provides the user with the asset data that has been searched for in various formats in response to the utterance.
[Configuration of Response Device 100]
FIG. 2 is a diagram showing an example of a configuration of the response device 100. A microphone that collects the utterance of the user and a human machine interface (HMI) are connected to the response device 100. The HMI presents various types of information to the user and also receives an input operation by the user. The HMI includes various types of display devices, speakers, buzzers, touch panels, switches, keys, and the like. The response device 100 may receive an instruction according to the user's manual operation on the HMI or may recognize the user's voice uttered to the microphone and receive the instruction from the user.

The response device 100 includes a controller 110 and a storage 120. The controller 110 includes, for example, a data acquirer 111, a database register 112, an utterance content interpreter 113, a searcher 114, and a responder 115. These components are implemented, for example, by a processor such as a central processing unit (CPU) executing a program (software) stored in the storage 120. Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by software and hardware in cooperation.

The storage 120 may be implemented by a storage device (a storage device including a non-transitory storage medium) such as a hard disk drive (HDD) or a flash memory, may be implemented by a removable storage medium (a non-transitory storage medium) such as a DVD or a CD-ROM, or may be a storage medium mounted in a drive device. A part or all of the storage 120 may be an external device capable of being accessed by the response device 100 such as a network attached storage (NAS) or an external storage server. In the storage 120, for example, corresponding information 122 is stored in addition to the program.

FIG. 3 is a diagram showing an example of content of the corresponding information 122. The corresponding information 122 is, for example, information in which information items indicating a field of asset data, a staff member related to the field, and a staff member contact method are associated with one another. The field is, for example, information indicating a feature or an attribute of the asset data, and is an example of "semantic content." As shown in FIG. 3, the staff member may be associated with one or more fields. The staff member is an operator who operates the database 200, a person who is familiar with the field predetermined by an asset data holder or the like, or a thing or a person who responds to an inquiry about the field. The information indicating the staff member contact method is, for example, contact information of the staff member (an e-mail address, a telephone number, a social networking service (SNS) account, or the like).

Returning to FIG. 2, the data acquirer 111 acquires data and metadata added to the data (i.e., asset data) from a terminal device of the asset data holder via a network. The network includes a cellular network, a Wi-Fi network, the Internet, a wide area network (WAN), a local area network (LAN), a public circuit, a provider device, a dedicated circuit, a radio base station, or the like. These components may directly perform wireless communication without involving a network NW. FIG. 4 is a diagram showing an example of content of the metadata. The metadata is information in which, for example, a title of the data, a creator of the data, a creation date and time of the data, and the like are associated.

Items of the metadata are examples only and are not limited to these. The items of the metadata may be defined in advance, for example, on the basis of a metadata schema. When the metadata is not added to the data (i.e., when the acquired information is "data" and is not "asset data"), the data acquirer 111 may request the data holder to add the metadata.

Returning to FIG. 2, the database register 112 generates a tag on the basis of the metadata added to the asset data acquired by the data acquirer 111. Hereinafter, the tag generated by the database register 112 will be referred to as a "data tag." The data tag indicates, for example, an attribute of data. The database register 112 registers the generated data tag in the database 200 in association with the asset data. The database register 112 generates the data tag on the basis of, for example, content of the asset data, the attribute of the asset data, the metadata included in the asset data, and the like. For example, when the asset data is "monthly sales of vehicles in 2018," a data tag associated with the asset data is a predetermined keyword such as a "sales company" that sold vehicles, a "vehicle model" of the sold vehicles, the "number of vehicles" that were sold, or the like. It is preferable that the database register 112 generate a large number of (for example, two or more) appropriate data tags with respect to the asset data.

The database register 112 may generate the data tag on the basis of data tag information and associate the data tag with the asset data. For example, data tag information is information in which information indicating the attribute of the asset data and one or more data tags that are preferably associated with the asset data of the attribute are associated. The database register 112 may provide the asset data to a data tag generation application and associate the obtained data tag with the asset data.

FIG. 5 is a diagram showing an example of content of the asset data stored in the database 200. In FIG. 5, the asset data is, for example, annual information in which a vehicle sales company, a vehicle model, and the number of sales are associated. Hereinafter, the description will be given under the assumption that at least a part of the asset data stored in the database 200 includes the asset data shown in FIG. 5.

The utterance content interpreter 113 interprets content of an utterance of the user indicated by text on the basis of the text input to the HMI by the user's manual operation. The user inputs text of natural language as the utterance content to the HMI. The utterance content interpreter 113 performs, for example, morphological analysis and dependency analysis of text. For the dependency analysis, for example, support vector machines (SVMs) are used in a shift-reduce method, a spanning tree method, and a chunk identification stage application method. According to analysis, the utterance content interpreter 113 analyzes that the text is text expressing an intention to search for the asset data registered in the database 200 and analyzes a phrase indicating search target asset data. Hereinafter, the phrase indicating the search target asset data is referred to as an "utterance tag."

The utterance tag is, for example, a keyword (a query) indicating an attribute of asset data, a phrase included in the asset data, or the like.

The utterance content interpreter 113 may interpret the content of the user's utterance on the basis of the user's utterance acquired by the microphone. In this case, the user speaks into the microphone using natural language. Then, the utterance content interpreter 113 performs morphological analysis and dependency analysis of the utterance content.

The searcher 114 searches the database 200 using the utterance tag as a search key when the utterance content interpreter 113 has interpreted the text as an utterance expressing an intention to search for the asset data. The searcher 114 identifies asset data associated with a data tag that matches an utterance tag or has a high degree of matching within the asset data registered in the database 200 as search target data. When the text includes a plurality of utterance tags, the searcher 114 identifies asset data associated with a plurality of data tags which match a plurality of utterance tags or have a high degree of matching or one or more data tags which match some of the plurality of utterance tags or have a high degree of matching as search target data.

The responder 115 causes the HMI to output the text interpreted by the utterance content interpreter 113 and information based on a search result of the searcher 114. The HMI is an example of an "outputter" and the display device provided in the HMI is an example of a "display." For example, every time the utterance content interpreter 113 interprets the text, the responder 115 generates a response screen IM including an utterance image CV showing the text and causes the HMI to display the response screen IM. Every time the responder 115 responds to the user, the responder 115 generates a response screen IM including a response image RP showing a response for the user and causes the HMI to display the response screen IM.

The responder 115 generates the response screen IM including the response image RP for asking the user about an output format of the asset data identified by the searcher 114 and causes the HMI to display the response screen IM. When the user has consented to the output format, the responder 115 outputs the asset data in the inquired output format. The output format of the asset data from the responder 115 will be described below.

[Output Format (1) of Asset Data]

Figure 6:
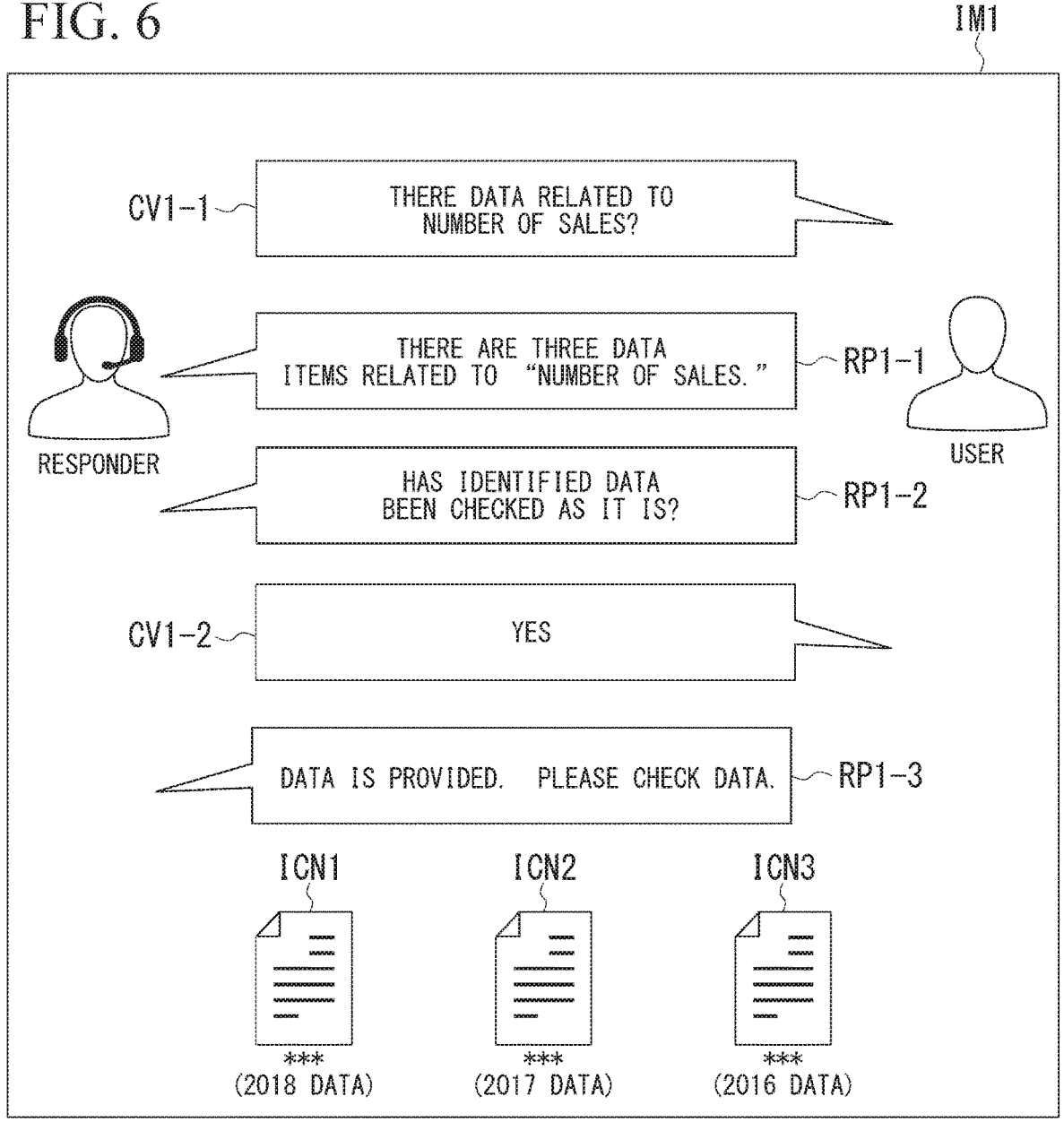
FIG. 6 is a diagram showing an example of a response screen IM1 when the asset data is output to the HMI as it is.

FIG. 6 is a diagram showing an example of a response screen IM1 when the asset data is output to the HMI as it is. For example, the response screen IM1 includes one or more response images RP (response images RP1-1 to RP1-3 in FIG. 6) showing responses of the responder 115 for the user and one or more utterance images CV (utterance images CV1-1 and CV1-2 in FIG. 6) showing text in the order of dialogue.

In FIG. 6, the utterance content interpreter 113 interprets the text shown in the utterance image CV1-1 and interprets only the "number of sales" as an utterance tag. Here, when the number of utterance tags included in the text is less than a predetermined reference (for example, about one or two), the searcher 114 only identifies the asset data associated with the data tag associated with the utterance tag and it is more difficult to narrow down the asset data according to the user's request. In this case, the responder 115 causes the HMI to display the response image RP1-2 for asking the user about outputting the identified asset data as it is in a state in which the response image RP1-2 is included in the response screen IM1 because the number of data tags associated with the asset data is less than a predetermined reference (i.e., the number of utterance tags included in the text is less than the predetermined reference) (in this case, one).

When the text for the output format of the asset data shown in the response images RP1-2 has been interpreted by the utterance content interpreter 113 to express an intention to consent to the output format, the responder 115 causes the HMI to display the response images RP1-3 showing that the asset data is provided according to the inquiry output format and icon images ICN (icon images ICN1 to ICN3 in FIG. 6) included on the response screen IM1. The icon images ICN are icon images ICN associated with one or more identified asset data items and are images associated with storage locations of the asset data in the database 200. Thereby, the responder 115 can provide the user with the asset data by allowing the user to perform an operation of designating the icon image ICN associated with desired asset data among the icon images ICN1 to ICN3 on the touch panel of the HMI.

[Output Format (2) of Asset Data]

Figure 7:
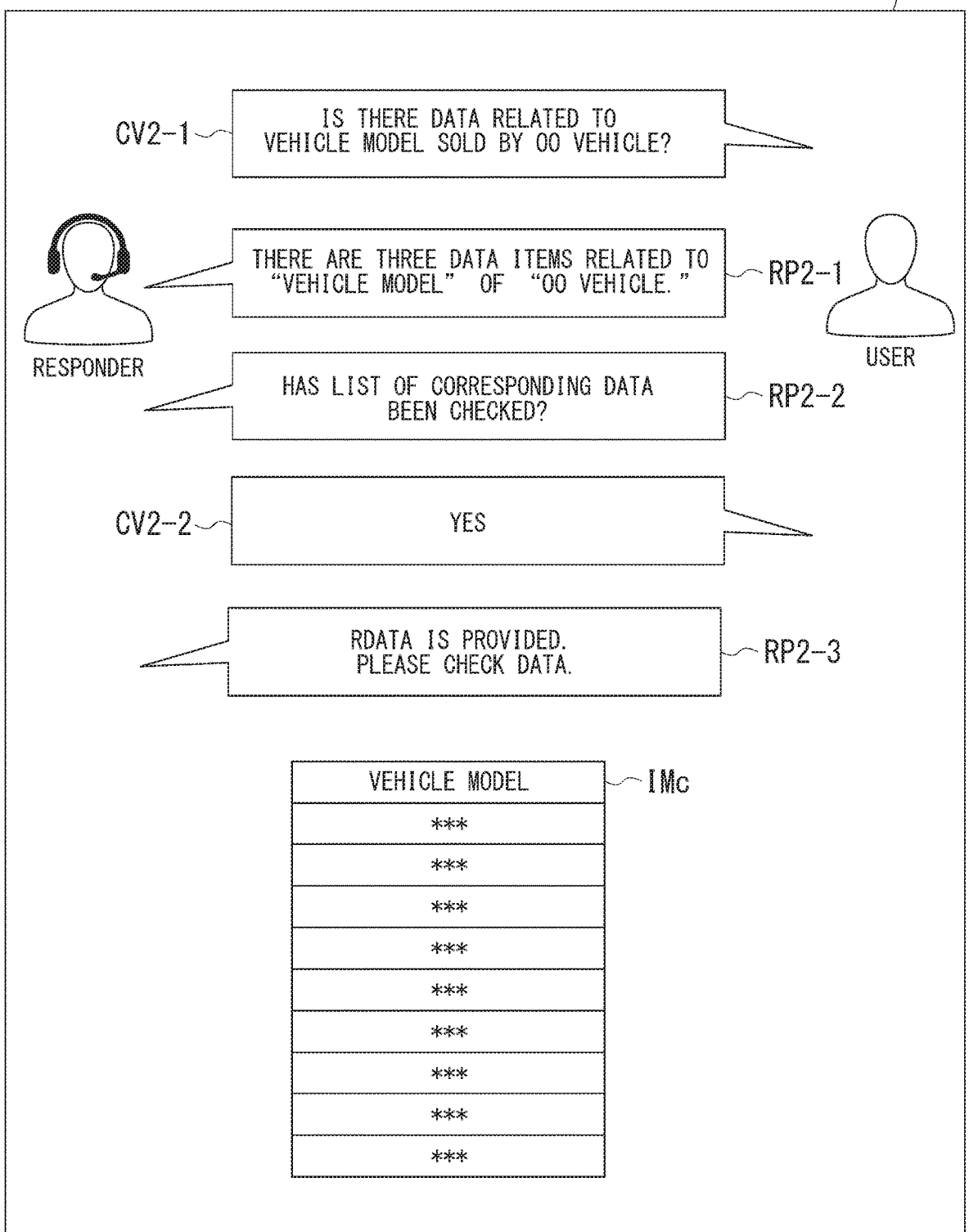
FIG. 7 is a diagram showing an example of a response screen IM2 when asset data in which two or more data tags match is output.

FIG. 7 is a diagram showing an example of a response screen IM2 when asset data in which two or more data tags match is output. Similar to the response screen IM1, the response screen IM2 includes one or more response images RP (response images RP2-1 to RP2-3 in FIG. 7) and one or more utterance images CV (utterance images CV2-1 and CV2-2 in FIG. 7) in the order of dialogue.

In FIG. 7, the utterance content interpreter 113 interprets the text shown in the utterance image CV2-1 and interprets two tags of "OO Vehicle (car dealer)" and a "vehicle model" as utterance tags. Therefore, the text shown in the utterance image CV2-1 includes more utterance tags than the text shown in the utterance image CV1-1. Here, when the number of utterance tags included in the text is a predetermined reference (for example, two or more), the searcher 114 can perform narrowing down to asset data associated with a data tag that matches any utterance tag or has a high degree of matching within identified asset data. In this case, because the number of data tags associated with the asset data is greater than or equal to the predetermined reference (two in this case), the responder 115 causes the HMI to display the response image RP2-2 for asking the user about outputting a list (a column) of results narrowed down by a number of data tags greater than or equal to the predetermined reference in a state in which the response image RP2-2 is included on the response screen IM2.

When the text for the output format of the asset data shown in the response image RP2-2 has been interpreted by the utterance content interpreter 113 to express an intention to consent to the output format, the responder 115 causes the HMI to display the response image RP2-3 showing that the asset data is provided according to the inquiry output format and a column image IMc showing a column included on the response screen IM2. In this example, the column image IMc is an image obtained by extracting information described in the column of the "vehicle model" from the asset data shown in FIG. 5. Thereby, the responder 115 can provide the asset data to the user in an appropriate format.

[Output Format (3) of Asset Data]

Figure 8:
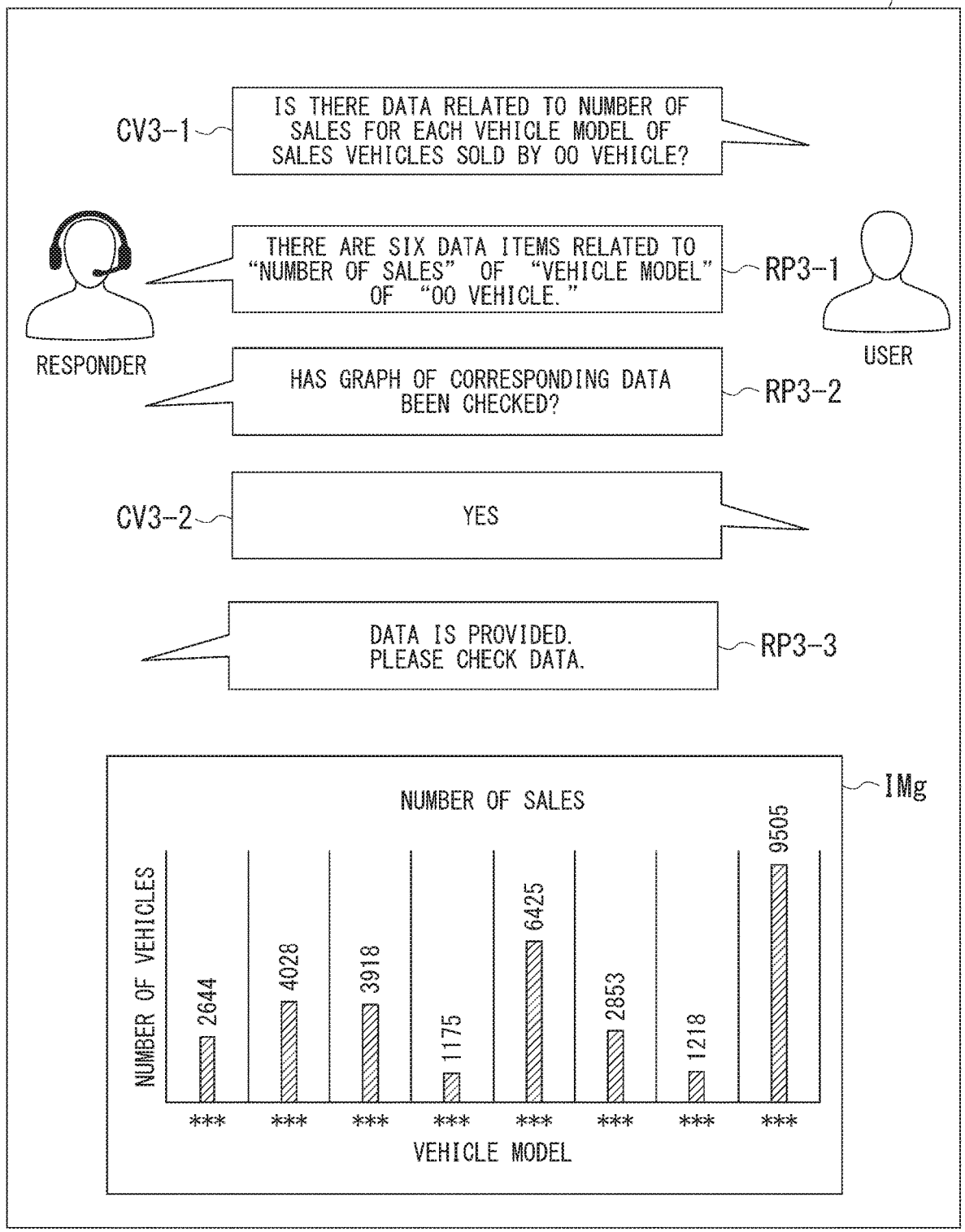
FIG. 8 is a diagram showing an example of a response screen IM3 when a graph showing identified asset data is output.

FIG. 8 is a diagram showing an example of a response screen IM3 when a graph showing the identified asset data is output. Similar to the response screens IM1 and IM2, the response screen IM3 includes one or more response images RP (response images RP3-1 to RP3-3 in FIG. 8) and one or more utterance images CV (utterance images CV3-1 and CV3-2 in FIG. 8) in the order of dialogue.

In FIG. 8, the utterance content interpreter 113 interprets the text shown in the utterance image CV3-1 and interprets three tags of "OO Vehicle," a "vehicle model," and the "number of sales" as utterance tags. Therefore, the text shown in the utterance image CV3-1 includes more utterance tags than the text shown in the utterance image CV1-1 and the utterance image CV2-1. When the data tag associated with the utterance tag used for the search of the searcher 114 is an attribute indicating a change in a quantity over time, a magnitude relationship, a ratio, or the like, the content of the asset data associated with the data tag is comparable content such as a change in a quantity over time, a magnitude relationship, or a ratio and a relationship thereof may be visually represented. When the content of the asset data identified by the searcher 114 is comparable content (in this case, the "number of sales") such as a change in a quantity over time, a magnitude relationship, or a ratio, the responder 115 causes the HMI to display the response image RP3-2 for asking the user about outputting a graph using the identified asset data in a state in which the response image RP3-2 is included in the response screen IM3.

When the text for the output format of the asset data shown in the response image RP3-2 has been interpreted by the utterance content interpreter 113 to express an intention to consent to the output format, the responder 115 causes the HMI to display the response image RP3-3 showing that the asset data is provided according to the inquiry output format and a graph image IMg showing a graph included on the response screen IM3. In the present example, the graph image IMg is an image showing a graph in which the "vehicle model" and the "number of sales" associated with the "vehicle model" are extracted from the asset data shown in FIG. 5, the "vehicle model" is designated as the horizontal axis, and the "number of sales" associated with the "vehicle model" is designated as the vertical axis. Thereby, the responder 115 can provide the asset data to the user in an appropriate format.

[About Output of Contact Information of Staff Member]

Figure 9:
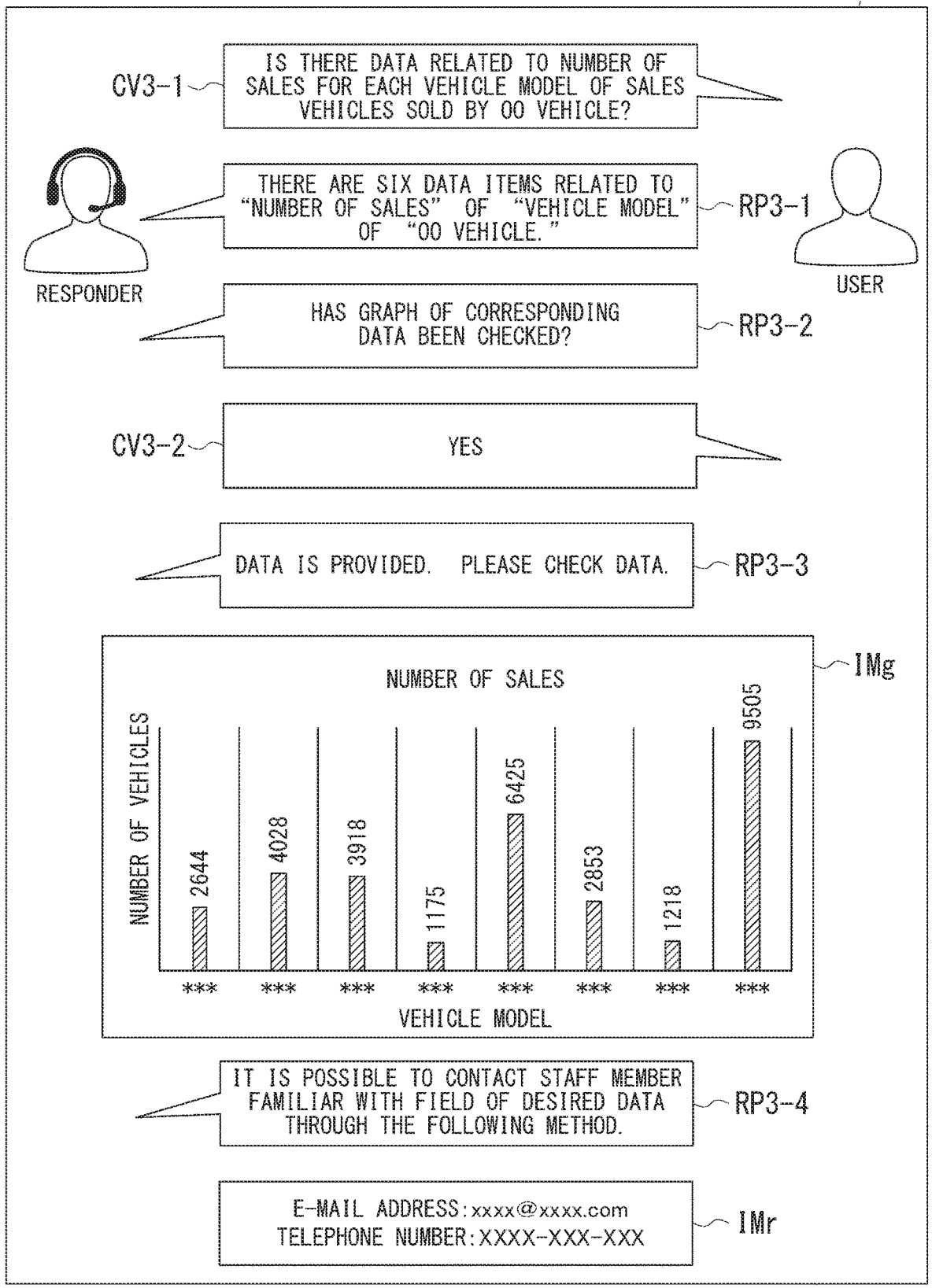
FIG. 9 is a diagram showing an example of a response screen IM3-1 when a staff member contact method is output.

Although a case in which the responder 115 outputs the asset data according to the output formats of the response screens IM1 to IM3 has been described above, the present invention is not limited thereto. The responder 115 may provide the user with a staff member contact method related to asset data identified by the searcher 114. FIG. 9 is a diagram showing an example of a response screen IM3-1 when the staff member contact method is output. For example, the responder 115 searches for corresponding information 122 using an utterance tag used in the search by the searcher 114 or a data tag associated with the asset data of a search result as a search key and identifies a staff member associated with the utterance tag or the data tag. The responder 115 causes the HMI to display a response image RP3-4 showing that a method of making contact with the specified staff member is provided and a contact method image IMr showing a method of making contact with the staff member included in the response screen IM3-1. Thereby, the responder 115 can provide the user with information about the staff member familiar with the data.

[Operation Flow]

Figure 10:
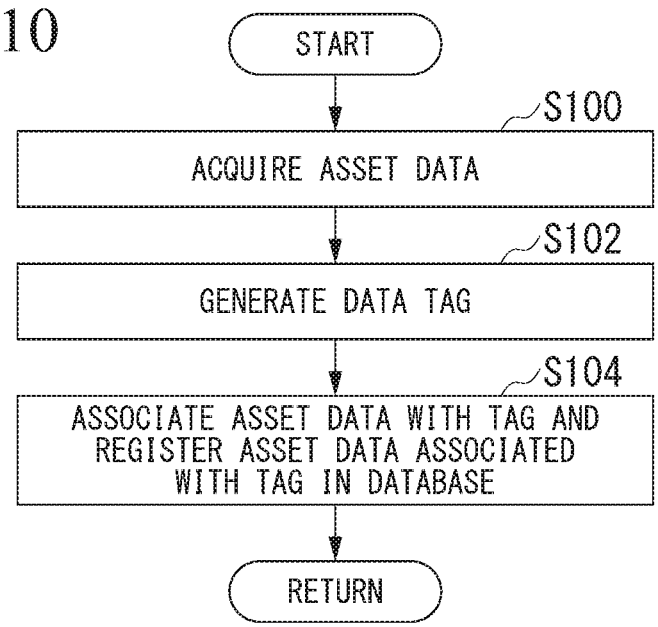
FIG. 10 is a flowchart showing a flow of a series of processing steps of registering asset data in a database.

FIG. 10 is a flowchart showing a flow of a series of processing steps of registering asset data in the database 200. First, the data acquirer 111 acquires the asset data from an asset data holder (step S100). The database register 112 generates a data tag on the basis of content of the asset data acquired by the data acquirer 111, an attribute of the asset data, metadata included in the asset data, and the like (step S102). The database register 112 registers the generated data tag in the database 200 in association with the acquired asset data (step S104).

Figure 11:
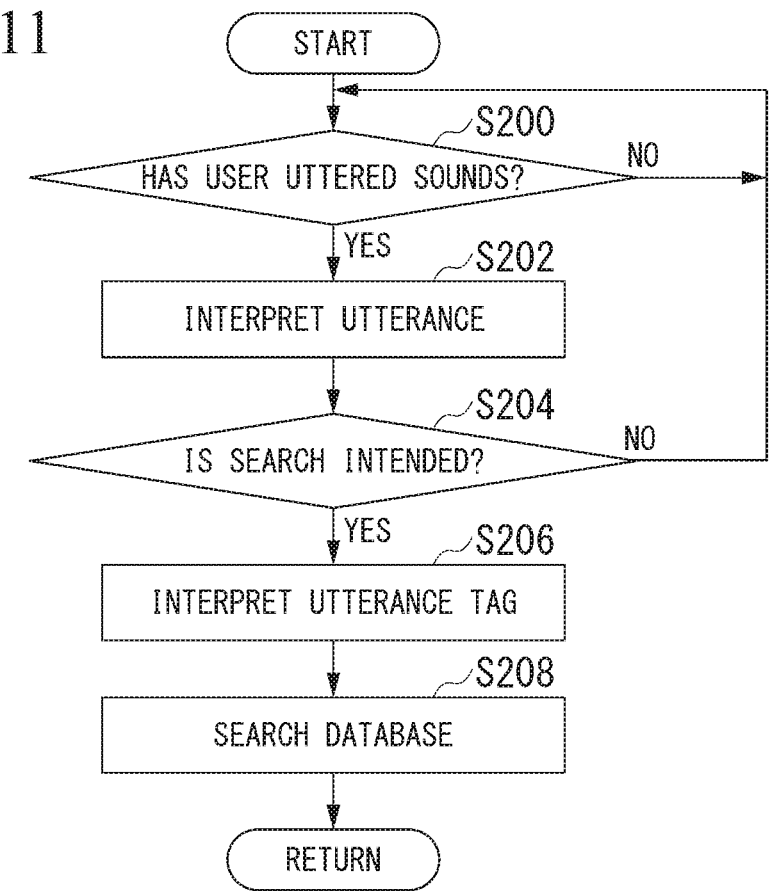
FIG. 11 is a flowchart showing a flow of a series of processing steps of searching for asset data.

FIG. 11 is a flowchart showing a flow of a series of processing steps of searching for asset data. First, the utterance content interpreter 113 determines whether or not the user has uttered sounds (step S200). The utterance includes the input of text to the HMI and the utterance of natural language to the microphone. The utterance content interpreter 113 waits until the user utters sounds. When the utterance content interpreter 113 determines that the user has uttered sounds, the utterance content interpreter 113 interprets content of the user's utterance on the basis of the text input to the HMI or the user's utterance acquired by the microphone (step S202). Hereinafter, a case in which the user utters sounds by inputting text to the HMI will be described. The utterance content interpreter 113 determines whether or not the interpreted text expresses an intention to search for asset data (step S204). When it is determined that the interpreted text expresses an intention to search for the asset data, the utterance content interpreter 113 analyzes an utterance tag included in the text (step S206). The searcher 114 searches the database 200 on the basis of the utterance tag analyzed by the utterance content interpreter 113 and identifies asset data associated with a data tag that matches the utterance tag or has a high degree of matching (step S208).

Figure 12:
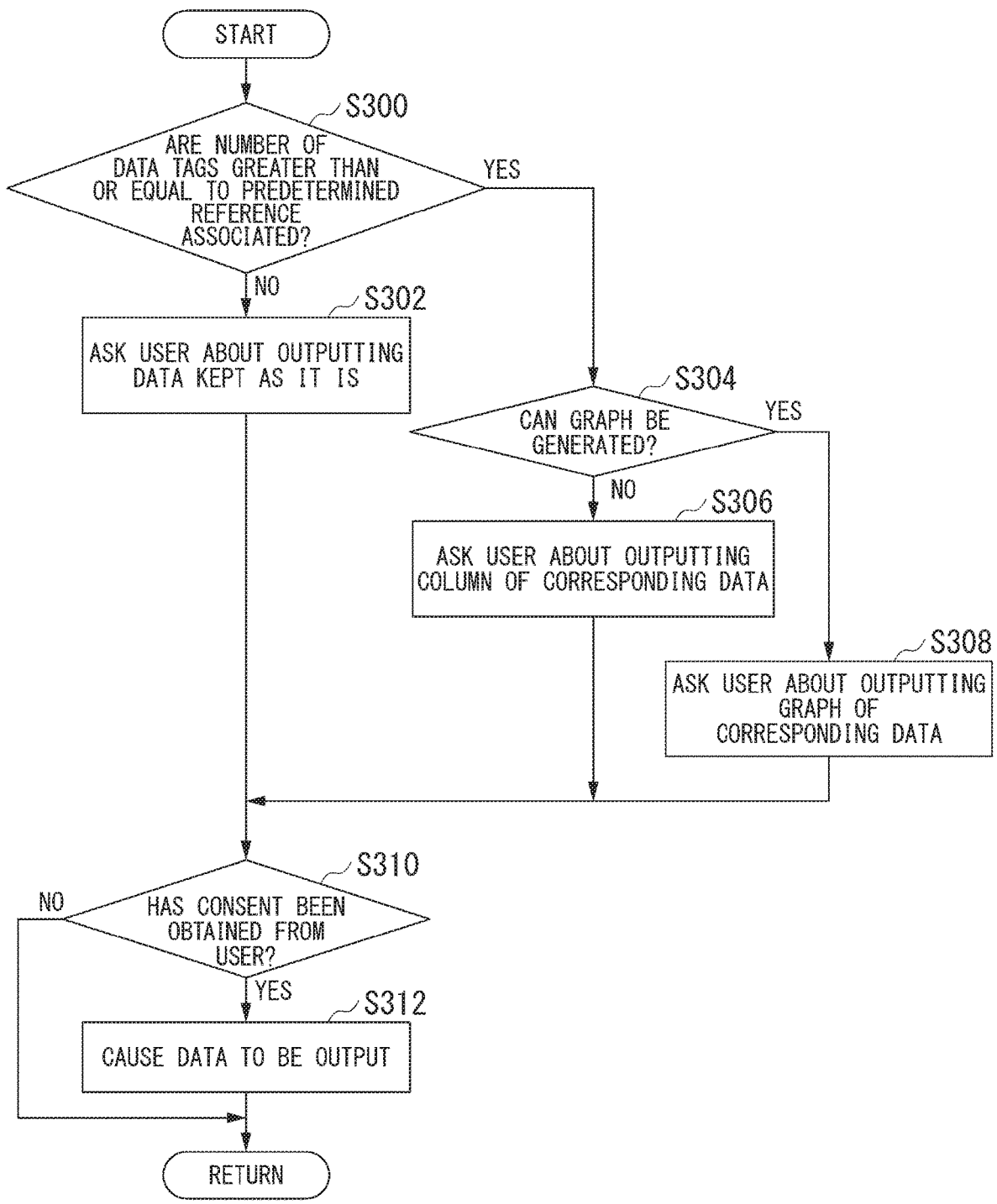
FIG. 12 is a flowchart showing a flow of a series of processing steps of determining an output format of the asset data.

FIG. 12 is a flowchart showing a flow of a series of processing steps of determining an output format of asset data. First, the responder 115 determines whether or not the asset data identified by the searcher 114 is associated with a number of data tags greater than or equal to a predetermined reference (step S300). When the responder 115 determines that the asset data is not associated with a number of data tags greater than or equal to the predetermined reference, the responder 115 asks the user about outputting the asset data identified by the searcher 114 as it is (step S302). When the asset data is associated with a number of data tags greater than or equal to the predetermined reference, the responder 115 determines whether or not content of the asset data identified by the searcher 114 is comparable content such as a change in a quantity over time, a magnitude relationship, or a ratio (i.e., whether or not the asset data can be represented as a graph) (step S304). When it is determined that the content of the identified asset data is not comparable content such as a change in a quantity over time, a magnitude relationship, or a ratio, the responder 115 asks the user about outputting a list (a column) of results narrowed down by a number of data tags greater than or equal to the predetermined reference (step S306).

When it is determined that the content of the asset data identified by the searcher 114 is comparable content such as a change in a quantity over time, a magnitude relationship, or a ratio, the responder 115 asks the user about outputting a graph using the identified asset data (step S308). The responder 115 determines whether or not the text for the inquiry has been interpreted by the utterance content interpreter 113 to express an intention to consent to the output format (step S310). When the responder 115 determines that the text has been interpreted by the utterance content interpreter 113 to express the intention to consent to the output format, the responder 115 outputs the asset data to the HMI according to the proposed output format (step S312).

Although a case in which the responder 115 provides asset data when the user's consent has been obtained with respect to the inquiry about the output format has been described, the present invention is not limited thereto. The responder 115 may determine an output format in accordance with the data tag associated with the asset data or the content of the identified asset data and provide the user with the asset data according to the determined output format without the user's consent. Thereby, the response device 100 can reduce the time and effort for the user to produce an utterance expressing consent.

As described above, the response device 100 according to the present embodiment enables the user to easily search for the data by searching for the asset data within the database 200 on the basis of the utterance content while responding to the inquiry from the user.

Modified Examples

Modified examples of the above-described embodiment will be described below. Although a case in which the asset data is provided to the user according to a graph when the graph can be provided and according to a column when the column can be provided has been described in the embodiment, the present invention is not limited thereto. In the modified example, a case in which the output format of the asset data is determined in accordance with the selection of the user will be described. Components similar to those of the above-described embodiment are denoted by the same reference signs and the description thereof will be omitted.

Figure 13:
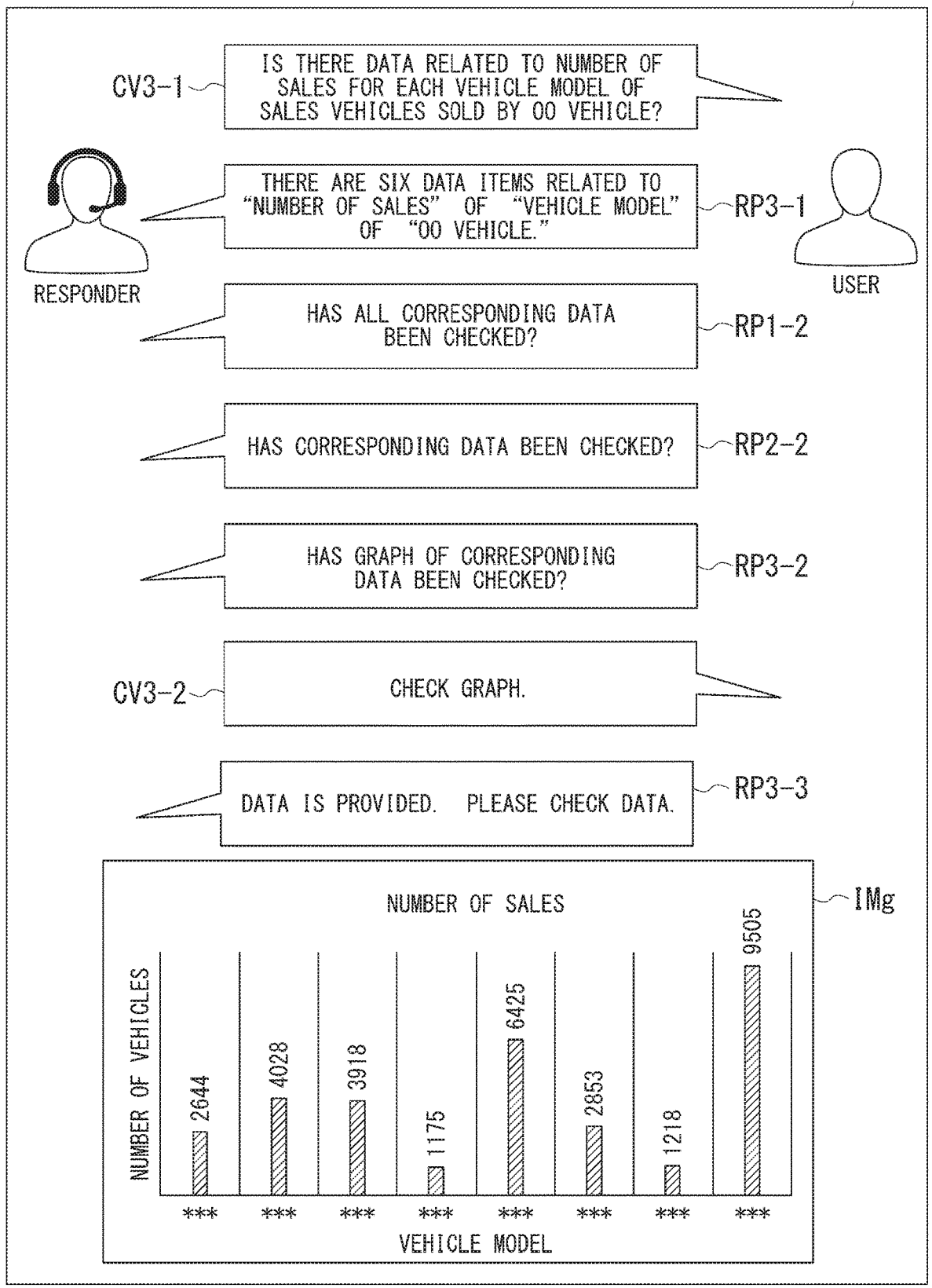
FIG. 13 is a diagram showing an example of a response screen IM4 when the output format of asset data is selected.

FIG. 13 is a diagram showing an example of a response screen IM4 when the output format of asset data is selected. For example, the responder 115 causes the HMI to display a response image RP1-2, a response image RP2-2, and a response image RP3-2 for asking the user about outputting the identified asset data as it is in a state in which the response image RP1-2, the response image RP2-2, and the response image RP3-2 are included on the response screen IM4. The response image RP2-2 is an image for asking the user about outputting a column of results narrowed down by a number of data tags greater than or equal to a predetermined reference. The response image RP3-2 is an image for asking the user about outputting a graph using the identified asset data when the content of the asset data identified by the searcher 114 is comparable content such as a change in a quantity over time, a magnitude relationship, or a ratio.

The responder 115 determines an output format of the asset data on the basis of the text for the output format of the asset data shown in the response images RP1-2, RP2-2, and RP3-2. For example, when the text has been interpreted by the utterance content interpreter 113 to express an intention to select the output format in which the asset data is output as it is, the responder 115 causes the HMI to display an icon image ICN included on the response screen IM4. When the text has been interpreted by the utterance content interpreter 113 to express the intention to select the output format for outputting the asset data in a column, the responder 115 causes the HMI to display a column image IMc included on the response screen IM4. When the text has been interpreted by the utterance content interpreter 113 to express the intention to select the output format for outputting the asset data in a graph, the responder 115 causes the HMI to display a graph image IMg included on the response screen IM4.

As shown in an utterance image CV3-2 in FIG. 13, the utterance content interpreter 113 interprets the text to express an intention to select an output format for outputting the asset data in a graph. Therefore, the responder 115 causes the HMI to display a response image RP3-3 showing that the asset data is provided in the graph and a graph image IMg showing a graph included in the response screen IM3.

Thereby, the responder 115 can provide the asset data to the user in the output format desired by the user.

When the text has been interpreted by the utterance content interpreter 113 to express the intention to select a plurality of output formats, the responder 115 may provide the asset data to the user in one or more of the selected output formats. Thereby, the responder 115 can provide the user with data in a plurality of output formats with one utterance of the user.

[Operation Flow]

Figure 14:
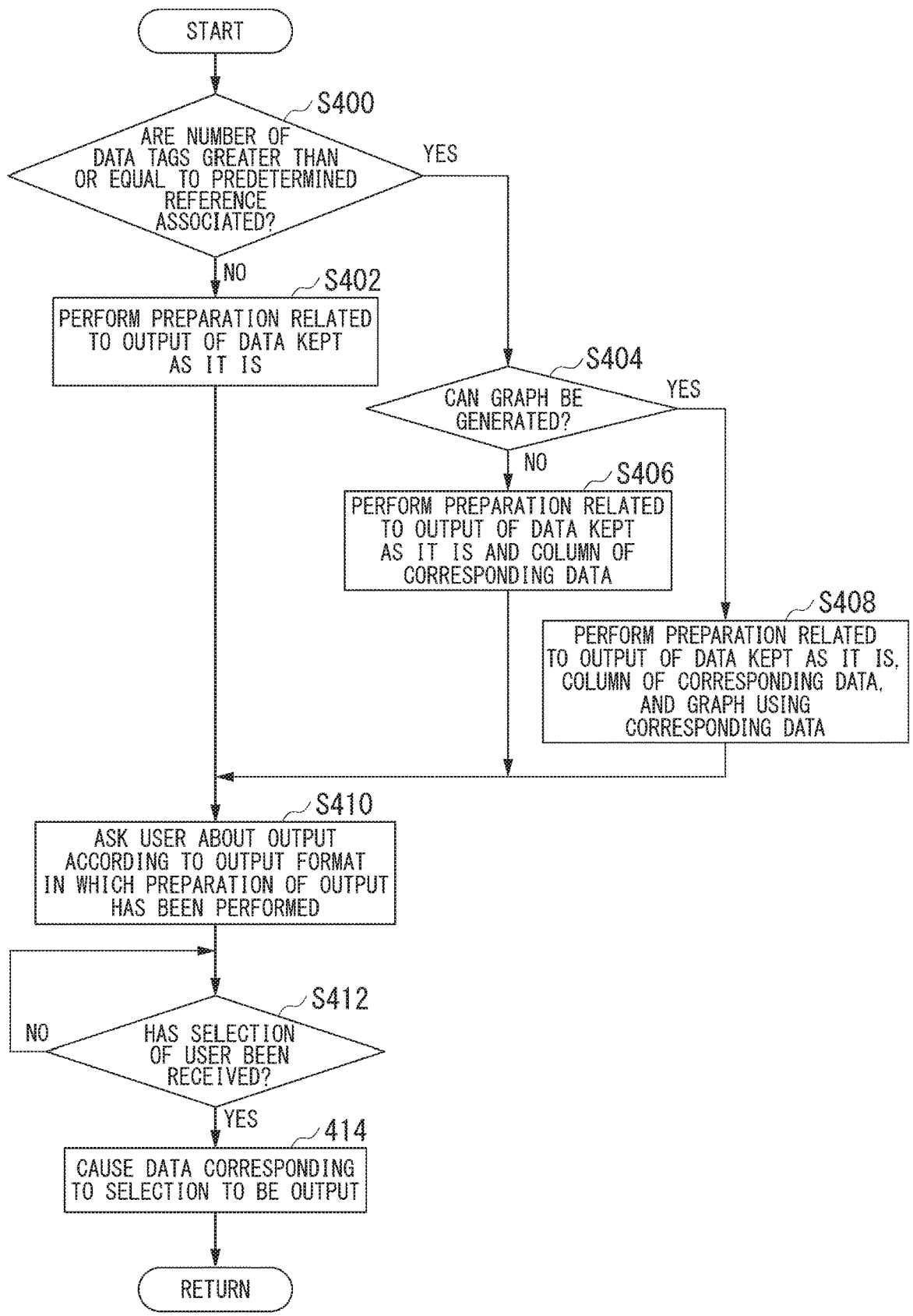
FIG. 14 is a flowchart showing a flow of a series of processing steps of determining an output format of asset data according to a modified example.

FIG. 14 is a flowchart showing a flow of a series of processing steps of determining an output format of asset data according to the modified example. First, the responder 115 determines whether or not the asset data identified by the searcher 114 is associated with a number of data tags greater than or equal to a predetermined reference (step S400). When it is determined that the asset data is not associated with a number of data tags greater than or equal to the predetermined reference, the responder 115 performs a preparation process for outputting the asset data identified by the searcher 114 as it is (step S402). For example, the responder 115 generates an icon image ICN related to the identified asset data.

When the asset data is associated with a number of data tags greater than or equal to the predetermined reference, the responder 115 determines whether or not content of the asset data identified by the searcher 114 is comparable content such as a change in a quantity over time, a magnitude relationship, or a ratio (i.e., whether or not the asset data is asset data capable of being represented as a graph) (step S404). When it is determined that the content of the identified asset data is not comparable content such as a change in a quantity over time, a magnitude relationship, or a ratio, the responder 115 performs a preparation process for outputting the above-described asset data as it is and a preparation process for outputting a list (a column) of results narrowed down by a number of data tags greater than or equal to the predetermined reference (step S406). For example, the responder 115 generates an icon image ICN and a column image IMc related to the identified asset data.

When it is determined that the content of the asset data identified by the searcher 114 is comparable content such as a change in a quantity over time, a magnitude relationship, or a ratio, the responder 115 performs a preparation process for outputting the above-described asset data as it is, a preparation process for outputting the above-described column, and a preparation process for outputting a graph using the identified asset data (step S408). For example, the responder 115 generates an icon image ICN, a column image IMc, and a graph image IMg related to the identified asset data. The responder 115 asks the user about outputting the asset data in the output format for which the preparation process has been performed (step S410). The responder 115 determines whether or not the text interpreted by the utterance content interpreter 113 expresses an intention to select the output format (i.e., whether or not the selection has been received) (step S412). The responder 115 outputs the asset data prepared in the preparation process to the HMI on the basis of the user's selection of the output format interpreted by the utterance content interpreter 113 (step S414).

Here, in the response device 100 of the modified example, in step S406 or S408, a preparation process for outputting one or more identified asset data items is a configuration in which a preparation process of the asset data of each output format can be distributed and various types of processes are executed asynchronously. In the configuration in which the distributed process is possible, for example, the controller 110 may be partitioned into a plurality of partitions or configured by one or more CPUs, one or more FPGAs (or LSIs, ASICs, or GPUs), or a combination thereof. Thereby, the response device 100 of the modified example can provide a plurality of data items to the user with one dialogue. A plurality of data items can be provided to the user quickly.

[Other Forms of Output Format Determination Process of Responder 115]

Although a case in which the responder 115 provides the user with the asset data obtained using an utterance tag included in text interpreted by the utterance content interpreter 113 has been described above, the present invention is not limited thereto. The responder 115 may output the asset data to be provided to the user, for example, on the basis of history information in which a history of the text and a search result of the searcher 114 (i.e., identified asset data) are associated with each other. In this case, the history information is stored in the storage 120 and the response device 100 includes an update function part of updating the history information every time the response device 100 is used by the user.

[Meta Database]

Although a case in which asset data is stored in the database 200 and the searcher 114 searches for a data tag associated with the asset data using an utterance tag and identifies the asset data has been described above, the present invention is not limited thereto. For example, a meta database that stores only metadata within asset data may be provided separately from the database 200 related to the asset data. In this case, the metadata is associated with one or more pieces of additional information and the meta database stores the additional information together with the metadata. The searcher 114 may search for and identify metadata by searching for additional information within the metadata database on the basis of the text (or the content of the utterance of the user) interpreted by the utterance content interpreter 113.

Although modes for carrying out the present invention have been described using embodiments, the present invention is not limited to the embodiments, and various modifications and substitutions can also be made without departing from the scope and spirit of the present invention.

What is claimed is:

1. A response device comprising:
   a data acquirer configured to acquire data to which metadata is added;
   a database configured to generate a tag on the basis of the metadata and register the generated tag in the database in association with the data to which the metadata is added;
   an utterance content interpreter configured to interpret content of an utterance of a user;
   a searcher configured to search the database using the tag associated with the utterance content when an intention to search for the data has been interpreted by the utterance content interpreter; and
   a responder configured to cause an outputter to output information according to a search result of the searcher;
   wherein the responder is configured to cause the outputter to output data kept as it is associated with the tag in the database, the data or the metadata of an attribute matching an attribute of content of the tag obtained from the utterance content within the metadata added to the data associated with the tag obtained from the content of the utterance of the user, an image showing a graph using the search result, and information about a staff member associated with the content of the utterance of the user interpreted by the utterance content interpreter which is a result of referring to corresponding information in which semantic content is associated with the staff member with respect to one utterance of the user.

2. The response device according to claim 1, wherein the responder is configured to cause the outputter to output the data associated with the tag in the database as it is.

3. The response device according to claim 2,
wherein the database has data with which two or more tags are associated, and
wherein the responder is configured to cause the outputter to output the data or the metadata of an attribute matching an attribute of content of a tag obtained from the utterance content within the metadata added to the data associated with the tag obtained from the content of the utterance of the user.

4. The response device according to claim 1, wherein the responder is configured to generate an image showing a graph using the search result and cause the outputter, which is a display, to output the generated image.

5. The response device according to claim 1, wherein the responder is configured to cause the outputter to output information about a staff member associated with the content of the utterance of the user interpreted by the utterance content interpreter with reference to corresponding information in which semantic content is associated with the staff member.

6. The response device according to claim 1,
wherein the searcher or the responder is a component in which distributed processing is possible, and
wherein the responder asynchronously is configured to execute causing the outputter to output data kept as it is associated with the tag in the database, the data or the metadata of an attribute matching an attribute of content of the tag obtained from the utterance content within the metadata added to the data associated with the tag obtained from the content of the utterance of the user, an image showing a graph using the search result, and information about a staff member associated with the content of the utterance of the user interpreted by the utterance content interpreter which is a result of referring to corresponding information in which semantic content is associated with the staff member with respect to one utterance of the user.

7. The response device according to claim 1,
wherein history information including the utterance content and the search result of the searcher is stored in a storage device when the content of the utterance of the user has been interpreted by the utterance content interpreter, and
wherein the responder is configured to cause the outputter to output the search result according to the history information of the storage device with respect to the utterance of the user.

8. The response device according to claim 1, wherein the utterance content interpreter is configured to interpret the content of the utterance of the user input as natural language.

9. A response method comprising:
acquiring, by a computer, data to which metadata is added;
generating, by the computer, a tag on the basis of the metadata;
registering, by the computer, the generated tag in a database in association with the data to which the metadata is added;
interpreting, by the computer, content of an utterance of a user;
searching, by the computer, the database using the tag associated with the utterance content when an intention to search for the data has been interpreted;
causing, by the computer, an outputter to output information according to a search result; and
causing, by the computer, the outputter to output data kept as it is associated with the tag in the database, the data or the metadata of an attribute matching an attribute of content of the tag obtained from the utterance content within the metadata added to the data associated with the tag obtained from the content of the utterance of the user, an image showing a graph using the search result, and information about a staff member associated with the content of the utterance of the user which is a result of referring to corresponding information in which semantic content is associated with the staff member with respect to one utterance of the user.

10. A non-transitory computer-readable storage medium that is configured to store a computer program to be executed by a computer to perform at least:
acquiring data to which metadata is added;
generating a tag on the basis of the metadata;
registering the generated tag in a database in association with the data to which the metadata is added;
interpreting content of an utterance of a user;
searching the database using the tag associated with the utterance content when an intention to search for the data has been interpreted;
causing an outputter to output information according to a search result; and
causing the outputter to output data kept as it is associated with the tag in the database, the data or the metadata of an attribute matching an attribute of content of the tag obtained from the utterance content within the metadata added to the data associated with the tag obtained from the content of the utterance of the user, an image showing a graph using the search result, and information about a staff member associated with the content of the utterance of the user which is a result of referring to corresponding information in which semantic content is associated with the staff member with respect to one utterance of the user.

\* \* \* \* \*